United States Patent [19]

Hogen-Esch et al.

[11] Patent Number: 5,610,248

[45] Date of Patent: Mar. 11, 1997

[54] BLOCK COPOLYMERS AND A NOVEL METHOD FOR PREPARING (CO)POLYMERS HAVING A NARROW MOLECULAR WEIGHT DISTRIBUTION BY METAL-FREE ANIONIC POLYMERIZATION IN THE PRESENCE OF A PHOSPHONIUM CATION

[75] Inventors: Thieo Hogen-Esch; Angela Zagala, both of Los Angeles, Calif.

[73] Assignee: The University of Southern California, Los Angeles, Calif.

[21] Appl. No.: 398,694

[22] Filed: Mar. 6, 1995

[51] Int. Cl.$^6$ .................................................. C08F 4/00
[52] U.S. Cl. ....................... 526/193; 526/179; 525/314; 525/255
[58] Field of Search .................................. 526/193, 179; 525/314, 255

[56] References Cited

U.S. PATENT DOCUMENTS

| 4,849,488 | 7/1989 | Starzewski et al. | 526/193 |
| 5,436,280 | 7/1995 | Medsker, II et al. | 522/55 |

FOREIGN PATENT DOCUMENTS

| 3632361 | 1/1988 | Germany | 526/193 |
| 3700196 | 4/1988 | Germany | 526/193 |
| 3700195 | 7/1988 | Germany | 526/193 |

OTHER PUBLICATIONS

Kondo et al., "Photoinitiated Polymerization of Methyl Methacrylate and Styrene by a Phosphorus Ylide", Journal of Polymer Sci., Plym. Lett. Ed., Mar. 1983, vol. 21, No. 3, pp. 217–222.

*Primary Examiner*—Mark Warzel
*Attorney, Agent, or Firm*—Oblon, Spivak, McClelland, Maier & Neustadt, P.C.

[57] ABSTRACT

The present invention concerns a novel method for preparing polymers (preferably (meth)acrylate polymers and copolymers) having a narrow molecular weight distribution by metal-free anionic polymerization in the presence of a phosphonium cation. The present invention also concerns block copolymers and methods of making the same using anionic polymerization in the presence of a phosphonium cation to prepare at least one block of the copolymer.

16 Claims, No Drawings

BLOCK COPOLYMERS AND A NOVEL METHOD FOR PREPARING (CO)POLYMERS HAVING A NARROW MOLECULAR WEIGHT DISTRIBUTION BY METAL-FREE ANIONIC POLYMERIZATION IN THE PRESENCE OF A PHOSPHONIUM CATION

BACKGROUND OF THE INVENTION

1. Field of the Invention

The present invention concerns novel block copolymers and a novel method for preparing polymers (preferably (meth)acrylate polymers and copolymers) having a narrow molecular weight distribution by metal-free anionic polymerization in the presence of a phosphonium cation.

2. Discussion of the Background

In the last decade, great interest has emerged concerning the polymerization of (meth)acrylates, particularly methyl methacrylate (MMA), under ambient conditions. A number of new polymerization systems have been reported, and a recent review covers most of the literature on the polymerization of MMA at ambient temperatures.[1]

[1] Davis, T., Haddleton, D., Richards, S. J.M.S.-Rev. Macromol. Chem. Phys. 1994, C34, 243.

For example, a process known as Group Transfer Polymerization (GTP), introduced in the early 1980's, produced poly(methyl methacrylate) (PMMA) and allowed control of molecular weight distribution (MWD), molecular weight and molecular architecture at ambient temperatures.[2] Initially, coordinating ligands (μ-type ligands) such as metalated alkoxides[3] and lithium chloride[4] were utilized in the anionic polymerization of MMA. However, control of the MWD was lost at temperatures of $\geq -40°$ C. Thus, anionic polymerization in the presence of coordinating ligands was limited to temperatures of $< -40°$ C.

[2] (a) Webster, O., Hertler, W., Sogah, D., Farnham, W., and RajanBabu, T. J. Am. Chem. Soc. 1983, 105, 5706. (b) Sogah, D., Hertler, W., Webster, D., and Cohen, G. Macromolecules 1988, 20, 1473.

[3] Lochmann, L., Müller, A. Makromol. Chem. 1990, 191, 1657.

[4] Teyssie, P., Fayt, R., Hautekeer, J., Jacobs, C., Jerome, R., Leemans, L., Varshney, S. Makromol. Chem., Macromol. Symp. 1990, 32, 61. (b) Wang, J., Jerome, R., Teyssie, P. Macromolecules 1994, 27, 4902.

Other polymerization systems, such as Catalytic Chain Transfer Polymerization,[1] "Living" Free Radical Polymerization,[1,5] "Metal-free,"[6] "Coordination,"[7] "Screened,"[8] "High-Speed Immortal,"[9] and Crown Ether-Promoted[4a,10] anionic polymerizations have been successful to varying degrees in producing narrow MWD PMMA at ambient temperatures. Typically, anionic polymerization of MMA is conducted using bulky, delocalized carbanions as initiators, in polar solvents such as tetrahydrofuran (THF) at low temperatures (i.e., −78° C.) to prevent nucleophilic attack of the carbanion initiator at the carbonyl carbon atom of the ester group of the monomer or polymer.

[1] Davis, T., Haddleton, D., Richards, S. J.M.S.-Rev. Macromol. Chem. Phys. 1994, C34, 243.

[5] (a) Otsu, T. and Tazaki, T. Polym. Bull. 1986, 16, 277. (b) Georges, M., Veregin, R., Kazmaier, P., Hamer, G. Macromolecules 1993, 26, 2987. (c) Druliner, J. Macromolecules 1991, 24, 6079. (d) Madare, D. and Matyjaszewski. Polymer Preprints (Am. Chem. Soc., Div. Polym. Chem.) 1993, 34, 566).

[6] (a) Reetz, M., Knauf, T., Minet, U., and Bingel, C. Angew. Chem. Int. Ed. Engl. 1988, 27, 1371. (b) Reetz, M. Angew. Chem. (Advanced Materials) 1988, 100, 1026. (c) Reetz, M., Minet, U., Bingel, C., and Vogdanis, L. Polymer Preprints (Am. Chem. Soc., Div. Polym. Chem.) 1991, 32, 296. (d) Pietzonka, T. and Seebach, D. Angew. Chem. Int. Ed. Engl. 1993, 32, 716.

[7] (a) Yasuda, H., Yamamoto, H., Yokota, K., Miyake, S., and Nakamura, A. J. Am. Chem. Soc. 1992, 114, 4908. (b) Yasuda, H., Yamamoto, H., Yamashita, M., Yokota, K., Nakamura, A., Miyake, S., Kai, Y. and Kanehisa, N. Macromolecules 1993, 26, 7134.

[8] Ballard, D., Bowles, R., Haddleton, D., Richards, S., Sellens, R., and Twose, D. Macromolecules 1992, 25, 5907.

[9] (a) Sugimoto, H., Kuroki, M., Watanabe, T., Kawamura, C., Aida, T., and Inoue, S. Macromolecules 1993, 26, 3403. (b) Akatsuka, M., Aida, T., and Inoue, S. Macromolecules 1994, 27, 2820.

[4] Teyssie, P., Fayt, R., Hautekeer, J., Jacobs, C., Jerome, R., Leemans, L., Varshney, S. Makromol. Chem., Macromol. Symp. 1990, 32, 61. (b) Wang, J., Jerome, R., Teyssie, P. Macromolecules 1994, 27, 4902.

[10] (a) Varshney, S., Jerome, R., Bayard, P., Jacobs, C., Fayt, R., and Teyssie, P. Macromolecules 1992, 25, 4457. (b) Wang, J., Jerome, R., Bayard, P., Baylac, L., Patin, M., and Teyssie, P. Macromolecules 1994, 27, 4615.

Other organic cations such as trisdimethylaminosulfonium (TAS$^+$) have been found to be effective in related polymerization systems.[2,11] The n-Bu$_4$N$^+$ salt of 9-methylfluorenyl anion in THF at ambient temperatures produces PMMA with a relatively narrow MWD (2.0), but at low yields (14%).[12]

[2] (a) Webster, O., Hertler, W., Sogah, D., Farnham, W., and RajanBabu, T. J. Am. Chem. Soc. 1983, 105, 5706. (b) Sogah, D., Hertler, W., Webster, D., and Cohen, G. Macromolecules 1988, 20, 1473.

[11] (a) Starks, C. and Liotta, C. Phase Transfer Catalysis; Academic Press; New York; 1978. (b) Dehmlow, E. and Dehmlow, S. Phase Transfer Catalysis, 2nd Ed.; Verlag Chemie: Florida; 1983. (c) Weber, W. and Gokel, G. Phase Transfer Catalysis in Organic Synthesis; Springer-Verlag; New York; 1977. (d) Starks, C. (Ed.) Phase Transfer Catalysis; ACS Symposium Series 326; American Chemical Society; Washington, 1987.

[12] Quirk, R., and Bidinger, G. Polym. Bull. 1989, 22, 63.

Although Reetz et al have postulated that, in the anionic polymerization of n-butyl acrylate at ambient temperatures using a tetrabutylammonium countercation, the intramolecular Claisen type termination reaction is decreased because the electrostatic attraction between the alkoxide and the bulky n-Bu$_4$N$^+$ cation is weak, thereby thermodynamically and kinetically disfavoring the formation of the termination by-product tetrabutylammonium alkoxide.[6] Intramolecular cation coordination to the ante-penultimate ester carbonyl group is believed to catalyze the Claisen reaction in the case of alkali metal cations.[13] However, anionic polymerizations with ammonium countercations also suffer from some drawbacks, such as low yield, which may be the result of a Hoffmann elimination of a β-hydrogen from the ammonium cation at a rate competitive with polymerization.

[6] (a) Reetz, M., Knauf, T., Minet, U., and Bingel, C. Angew. Chem. Int. Ed. Engl. 1988, 27, 1371. (b) Reetz, M. Angew. Chem. (Advanced Materials) 1988, 100, 1026. (c) Reetz, M., Minet, U., Bingel, C., and Vogdanis, L. Polymer Preprints (Am. Chem. Soc., Div. Polym. Chem.) 1991, 32, 296. (d) Pietzonka, T. and Seebach, D. Angew. Chem. Int. Ed. Engl. 1993, 32, 716.

[13] (a) Schreiber, H. Makromol. Chem. 1950, 36, 86. (b) Goode, W., Owens, F., Myers, W. J. Polym. Sci. 1960, 47, 75. (c) Lochmann, L., Trekoval, J. Makromol. Chem. 1984, 185, 1819. (d) Gerner, F., Höcker, H., Müller, A., Schulz, G. Eur. Polym. J. 1984, 20, 349.

Thus, a need exists for a method for producing poly(meth)acrylate polymers and copolymers having a narrow molecular weight distribution (so-called "monodisperse" polymers), which provides effective control of (co)polymer molecular weight, of molecular weight distribution and of (co)polymer stereoregularity, in good yields and at ambient temperatures.

OBJECTS OF THE INVENTION

Accordingly, it is one object of the present invention to provide a novel method for anionically producing poly(meth)acrylate (co)polymers which provides a (co)polymer having a narrow molecular weight distribution.

It is a further object of the present invention to provide a novel method for producing poly(meth)acrylate (co)polymers by anionic polymerization which provides effective control of (co)polymer molecular weight.

It is a further object of the present invention to provide a novel method for producing poly(meth)acrylate (co)polymers by anionic polymerization which can provide effective control of (co)polymer stereoregularity (e.g., isotacticity and/or syndiotacticity).

It is a further object of the present invention to provide a novel method for producing poly(meth)acrylate (co)polymers by anionic polymerization which provides the (co)polymer in good yields.

It is a further object of the present invention to provide a novel method for producing poly(meth)acrylate (co)polymers which achieves the above objects at ambient temperatures.

These and other objects, which will become apparent in the following detailed description of the preferred embodiments, have been provided by a method for producing a (meth)acrylate (co)polymer, which comprises:

reacting a monomer of the formula:

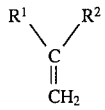

with an initiator of the formula

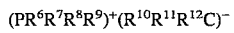

or of the formula

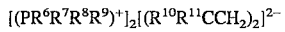

at a temperature of from −78° C. to 40° C., in a solvent in which the initiator at least partially dissolves and which does not quench the reaction, for a length of time sufficient to polymerize the monomer(s) and form a reaction mixture, wherein:

$R^1$ is selected from the group consisting of H, CN, $CF_3$, alkyl of from 1 to 6 carbon atoms and aryl, and $R^2$ is independently selected from the group consisting of CN, C(=X)$R^3$, C(=X)$NR^4R^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl, and any pair of $R^6$, $R^7$, $R^8$ and $R^9$ may be joined to form a ring, including the possibility that both pairs of $R^6$–$R^9$ may be joined to form a ring (preferably a 3- to 8-membered ring), $R^{10}$ and $R^{11}$ are independently alkyl of from 1 to 20 carbon atoms, an aryl group, CN, C(=X)$R^3$ as defined above and C(=X)$NR^4R^5$ as defined above, and $R^{10}$ and $R^{11}$ may be joined together to form a ring, except that $R^{10}$ and $R^{11}$ are not both alkyl of from 1 to 20 carbon atoms, and $R^{12}$ is independently H, alkyl of from 1 to 20 carbon atoms, aryl or a (co)polymer radical;

quenching the reaction mixture with an acyl halide, an acid anhydride or a substance containing an active hydrogen atom to form a (co)polymer; and isolating the formed (co)polymer.

DETAILED DESCRIPTION OF THE PREFERRED EMBODIMENTS

The present process can be used to make polymers and copolymers (hereinafter "(co)polymers") from a wide variety of monomers. Vinyl monomers suitable for the present process should bear at least one electron-withdrawing and/or formal negative charge-stabilizing group, such as an ester group, a keto group, a sulfone group, a phosphonate group, a heterocyclic ring, a phenyl ring bearing one or more electron-withdrawing and/or formal negative charge-stabilizing substituents, etc. The initiator can be any stabilized carbanion, but preferably one in which the corresponding neutral carbon acid has a $pK_a$ of from 12 to 37, and more preferably, a $pK_a$ of from 18 to 35. The key to the present process involving the anionic, metal-free polymerization of a vinyl monomer lies in the use of a phosphonium countercation.

The present Inventors have discovered that anionic polymerization of methylmethacrylate (MMA) in the presence of tetrabutylammonium cation (n-$Bu_4N^+$) in THF at ambient temperatures using triphenylmethyl anion ($Ph_3C^-$) as an initiator produced high molecular weight PMMA ($M_n$=322,500) with a narrow MWD (1.19). However, this system suffers from low yields (about 5%) and low initiator efficiencies (<1%). Other carbanions having lower basicity (e.g., 9-phenylfluorenyl, 9-ethylfluorenyl) were studied, but the rate of initiation with these initiators was slower than the rate of propagation, due to the lower nucleophilicity of the carbanions, which resulted in wider MWD's. The lower initiator efficiency of tetraalkylammonium systems may be attributed to a Hoffmann elimination reaction of the initiator or of enolate ions with n-$Bu_4N^+$.

The present invention provides (co)polymers, and particularly poly(meth)acrylates, having a relatively narrow molecular weight distribution, in quantitative yields at ambient temperatures. Molecular weights of the (co)polymers produced by the present process, which may be weight average or number average molecular weights, may be controlled by controlling the molar ratio of initiator to monomer, and may range from 500 g/mol to 300,000 g/mol, preferably from 1,000 to 200,000 g/mol, and most preferably from 2,000 to 60,000 g/mol. At room temperature (25° C.), the (co)polymers produced are relatively monodisperse ($M_w/M_n$≦1.3), but at 0° C., the (co)polymers become very monodisperse (e.g., an $M_w/M_n$ of about 1.06 for a PMMA produced using $(PPh_4)^+(CPh_3)^-$, having a MW of 30,000). In the context of the present application, the term "monodisperse" refers to a (co)polymer having a weight average molecular weight ($M_w$)/number average molecular weight ($M_n$) of ≦2.0, preferably ≦1.5, and most preferably ≦1.1.

The polymerization step of the present method is relatively rapid, generally being completed in 10 minutes or less. In some cases, the polymerization step may be completed in 5 minutes or less, and in further cases, 1 minute or less. However, the more rapid the polymerization, the higher the heat of polymerization and the higher the reaction temperature. Monomer conversions typically are complete (e.g., at least 90%, preferably at least 95% and most preferably at least 98% of the monomer are consumed during the polymerization reaction).

Because the present reacting step is a "living" polymerization, the process can be applied to preparation of block and multi-block copolymers. The bulky phosphonium cations are believed to prevent intramolecular cation coordination to the ante-penultimate ester carbonyl group.

Polymers produced using the present process have a variety of uses. For example, PMMA is the polymer used to make PLEXIGLAS. Furthermore, the polymers produced by the present method are sufficiently monodisperse as to provide PMMA or other polymer standards for size exclusion chromatography.

Monomers suitable for polymerization in the present method include those of the formula:

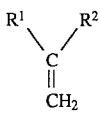

wherein:

$R^1$ is selected from the group consisting of H, CN, $CF_3$, alkyl of from 1 to 6 carbon atoms and aryl, and $R^2$ is independently selected from the group consisting of CN, C(=X)$R^3$, C(=X)$NR^4R^5$ and negative charge stabilizing heterocyclic rings, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring.

In the context of the present invention, "aryl" refers to phenyl and naphthyl, which may be substituted from 1 to 5 times (in the case of phenyl) or from 1 to 7 times (in the case of naphthyl) and preferably from 1 to 3 times (in both cases) with alkyl of from 1 to 20 carbon atoms, alkyl of from 1 to 6 carbon atoms (preferably methyl) in which each of the hydrogen atoms may be independently replaced by a halide (preferably a fluoride or a chloride), alkenyl of from 2 to 20 carbon atoms, alkynyl of from 1 to 20 carbon atoms, alkoxy of from 1 to 6 carbon atoms, alkylthio of from 1 to 6 carbon atoms, phenyl, halogen, $C_1$–$C_6$-dialkylamino, and phenyl which may be substituted with from 1 to 5 halogen atoms and/or $C_1$–$C_4$ alkyl groups. In the present application, "aryl" may also refer to pyridyl, preferably 2-pyridyl. More preferably, "aryl" refers to phenyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl.

In the context of the present invention, "heterocyclic rings capable of stabilizing an α-anion" refer to those heterocyclic rings which can stabilize a formal negative charge at a carbon atom covalently bound to the heterocyclic ring, such as is postulated for "living" anionic polymers. Thus, the vinyl group undergoing polymerization should be attached to the heterocyclic ring such that one or more of the heteroatoms in the heterocyclic ring stabilizes the negative charge on the "living" polymer intermediate. Accordingly, suitable vinyl heterocycles include 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and any vinyl pyrazine. The vinyl heterocycles mentioned above may bear one or more (preferably 1 or 2) $C_1$–$C_6$ alkyl or alkoxy groups, cyano groups, ester groups or halogen atoms. Further, those vinyl heterocycles which, when unsubstituted, contain an N-H group are protected at that position with a conventional blocking or protecting group, such as a $C_1$–$C_6$ alkyl group, a tris-$C_1$–$C_6$ alkyl silyl group, an acyl group of the formula $R^{18}$CO (defined below), etc.

More specifically, preferred monomers include (meth)acrylate esters of $C_1$–$C_{20}$ alcohols, acrylonitrile, cyanoacrylate esters of $C_1$–$C_{20}$ alcohols, didehydromalonate esters of $C_1$–$C_6$ alcohols, vinyl pyridines, vinyl N-alkylpyrroles, vinyl oxazoles, vinyl thiazoles, vinyl pyrimidines and vinyl imidazoles, vinyl ketones in which the α-carbon atom of the alkyl group does not bear a hydrogen atom (e.g., vinyl $C_1$–$C_6$-alkyl ketones in which both α-hydrogens are replaced with $C_1$–$C_4$ alkyl, halogen, etc., or a vinyl phenyl ketone in which the phenyl may be substituted with 1–5 $C_1$–$C_6$-alkyl groups), and styrenes bearing electron-donating and electron-withdrawing groups on the phenyl ring (e.g., one or more halogen atoms, nitro groups, $C_1$–$C_6$ ester groups or cyano groups). The most preferred monomer is methyl methacrylate (MMA).

Suitable initiators include those of the formula:

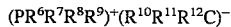

or of the formula

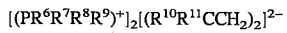

wherein:

$R^6$, $R^7$, $R^8$ and $R^9$ are independently alkyl of from 1 to 20 carbon atoms, aryl (as defined above) or aralkyl, $R^{10}$ and $R^{11}$ are independently alkyl of from 1 to 20 carbon atoms, an aryl group, CN, C(=X)$R^3$ as defined above and C(=X)$NR^4R^5$ as defined above, and $R^{10}$ and $R^{11}$ may be joined together to form a ring, except that $R^{10}$ and $R^{11}$ are not both alkyl of from 1 to 20 carbon atoms, and $R^{12}$ is independently H, alkyl of from 1 to 20 carbon atoms, aryl or a (co)polymer radical.

In the context of the present invention, "aralkyl" means aryl-substituted alkyl. Preferably, "aralkyl" is an aryl-substituted $C_1$–$C_{20}$-alkyl group, more preferably an aryl-substituted $C_1$–$C_6$-alkyl group.

Preferably, when one or more of $R^6$, $R^7$, $R^8$ and $R^9$ are aryl or aralkyl, the aryl moiety is phenyl, naphthyl, phenyl having from 1 to 5 substituents or naphthyl having from 1 to 7 substituents, the substituents being independently selected from the group consisting of alkyl of from 1 to 6 carbon atoms, alkoxy of from 1 to 6 carbon atoms, alkylthio of from 1 to 6 carbon atoms and $NR^{13}R^{14}$ in which $R^{13}$ and $R^{14}$ are independently alkyl of from 1 to 6 carbon atoms. Most preferably, each of $R^6$, $R^7$, $R^8$ and $R^9$ is phenyl.

One preferred initiator is potassium isobutyrate. Preferably, however, $R^{10}$ and $R^{11}$ are independently phenyl or phenyl having from 1 to 3 substituents selected from the group consisting of alkyl of from 1 to 6 carbon atoms, alkoxy of from 1 to 4 carbon atoms, phenyl and halogen; and $R^{12}$ is preferably H, alkyl of from 1 to 6 carbon atoms, phenyl, or phenyl having from 1 to 3 substituents selected from the group consisting of alkyl of from 1 to 6 carbon atoms, alkoxy of from 1 to 4 carbon atoms, phenyl and halogen. Most preferably, each of $R^{10}$, $R^{11}$ and $R^{12}$ is phenyl.

Examples of $R^{10}$ and $R^{11}$ being joined together to form a ring include fluorenyl and indenyl ring systems.

These initiators can be conveniently prepared by cation exchange (metathesis) at −78° C. from the corresponding alkali metal carbanion and phosphonium halide salts. The alkali metal carbanion salts can be prepared in accordance with known procedures (e.g., treatment of a compound of the formula $R^{10}R^{11}R^{12}$CH with an alkali metal hydride reagent; direct treatment of the compound of the formula $R^{10}R^{11}R^{12}$CH with an alkali metal; or by a metal-halide exchange between an alkali metal and the halide atom of a compound of the formula $R^{10}R^{11}R^{12}$CX, where X is chloride, bromide or iodide, preferably chloride). Alkali metals include lithium, sodium, potassium, rubidium and cesium, preferably potassium, rubidium and cesium, and most preferably potassium.

Many phosphonium halide reagents are commercially available. Others can be made by reacting a phosphine (i.e., a compound of the formula $PR^6R^7R^8$) with an alkyl or aryl halide of the formula $R^9X$ in accordance with known methods and procedures.

The alkali metal halide salt formed as a result of cation exchange can be filtered prior to use of the initiator in polymerization, but filtration is not necessary for polymerization to be successful.

The cation metathesis reaction occurs very rapidly (e.g., within seconds) and quantitatively, even at −78° C., in concurrence with previous reports.[14] A bathochromic shift in the maximum absorbance wavelength ($\lambda_{max}$) is observed during cation metathesis. For example, the typical red color of a solution of $Ph_3C^-K^+$ in THF ($2.0\times10^{-3}$M, $\lambda_{max}$=492 nm, $\epsilon$=26,420 L/mole·cm) changes into a deep maroon color characteristic of the corresponding phosphonium salt solution ($Ph_3C^-Ph_4P^+$, $\lambda_{max}$=506 nm) upon addition of $Ph_4P^+Cl^-$, which is insoluble in THF. The peak shape of the absorption spectrum remains the same after cation exchange, indicating that the structure of the carbanion is unchanged.

[14] Hunter, R., Hauelsen, R., Irving, A. Angew. Chem. Int. Ed. Engl. 1994, 33, 566.

Diaryl carbanions are also appropriate initiators. Such initiators can be used for living polymerization of a polymer, or for preparation of a block copolymer. For example, an organometal reagent-initiated (e.g., a $C_1$–$C_4$-alkyllithium-initiated) polymerization of an anionically polymerizable monomer (e.g., styrene) can be conducted in accordance with known methods to provide a "living" polymeric anion, which can be used to initiate the polymerization of the next comonomer. Suitable monomers for preparation of such a "living" (co)polymeric anion include styrene, α-methylstyrene, styrene or α-methylstyrene having 1 to 5 (preferably 1 to 3, most preferably 1) $C_1$–$C_4$-alkyl and/or $C_1$–$C_4$-alkoxy substituents on the phenyl ring, butadiene, isoprene, dimethylbutadiene, or mixtures thereof. The (co)polymeric anion can then be reacted with a 1,1-diarylethylene (for example, 1,1-diphenylethylene) to form a (co)polymer-diarylmethyl anion, which is then metathesized with a tetrasubstituted phosphonium halide to provide an initiator of the formula:

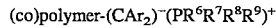
(co)polymer-(CAr$_2$)$^-$(PR$^6$R$^7$R$^8$R$^9$)$^+$ where Ar is an aryl group as defined above. This initiator can be used in the process of the present invention to make a block copolymer having a first polystyrene block and a second (co)polymer (e.g., poly(meth)acrylate or polyacrylonitrile) block.

Thus, the present invention also encompasses a method for preparing a block (co)polymer, comprising the steps of:

anionically polymerizing one or more first monomers to form a (co)polymer anion;

reacting the (co)polymer anion with a 1,1-diarylethylene to form a (co)polymer-diarylmethyl anion;

metathesizing the (co)polymer-diarylmethyl anion with a phosphonium salt of the formula:

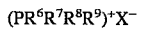
(PR$^6$R$^7$R$^8$R$^9$)$^+$X$^-$ where X is an inorganic anion (preferably selected from the group consisting of a halide, nitrate, nitrite, borate, tetraphenyl borate [$Ph_4B^-$], tosylate [p-$H_3CC_6H_4SO_3^-$], one-half equivalent of sulfite [or "($SO_3$)$_{0.5}$"], trifluoromethanesulfonate, one-half equivalent of sulfate [or "($SO_4$)$_{0.5}$"], one-third equivalent of phosphate [or "($PO_4$)$_{0.33}$"] and one-half equivalent of carbonate [or "($CO_3$)$_{0.5}$"], and $R^6$, $R^7$, $R^8$ and $R^9$ are independently alkyl of from 1 to 20 carbon atoms, aryl or aralkyl (wherein any pair of $R^6$, $R^7$, $R^8$ and $R^9$ may be joined to form a ring, including the possibility that both pairs of $R^6$–$R^9$ may be joined to form a ring [preferably a 3- to 8-membered ring]), to provide an initiator;

reacting the initiator with one or more monomers of the formula:

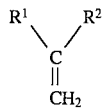

at a temperature of from −78° C. to 40° C., in a solvent in which the initiator at least partially dissolves and which does not quench the reaction, for a length of time sufficient to polymerize the first monomer, wherein $R^1$ is selected from the group consisting of H, CN, $CF_3$, alkyl of from 1 to 6 carbon atoms and aryl, and $R^2$ is independently selected from the group consisting of CN, C(=X)$R^3$, C(=X)NR$^4$R$^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring, to form a reaction mixture;

quenching the reaction mixture with an acyl halide, an acid anhydride or a substance containing an active hydrogen atom to form a block (co)polymer; and isolating the formed block (co)polymer.

The present invention is also concerned with a block copolymer of the formula:

A—(CH$_2$CAr$_2$)—B where A is a (co)polymer produced by anionic polymerization (preferably of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene, or mixtures thereof), Ar is an aryl group (as defined above) and B is a (co)polymer of one or more monomers the formula:

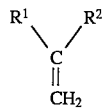

where $R^1$ and $R^2$ are as defined above.

The weight or number average molecular weight of block A may range from 300 to 500,000 g/mol, more preferably 500 to 300,000 g/mol, and most preferably 1,000 to 100,000 g/mol. Similar to the monodisperse (co)polymer described above, the weight or number average molecular weight of block B may range from 500 g/mol to 300,000 g/mol, preferably from 1,000 to 200,000 g/mol, and more preferably from 2,000 to 60,000 g/mol. The present block copolymers are also preferably "monodisperse" in that they may have a $M_w/M_n$ value of ≤2.0, preferably ≤1.5, and most preferably ≦1.1. A preferred block copolymer is one in which block A is polystyrene, poly(α-methylstyrene) or copoly(styrene-α-methylstyrene), and block B is polyacrylonitrile.

In addition, a dimeric initiator having the formula $(Ar_2C^- CH_2)_2 (PR^6R^7R^8R^9)^+{}_2$ where Ar is aryl can be prepared by reacting a 1,1-diarylethylene (preferably 1,1-diphenylethylene) with an alkali metal in THF, followed by metathesis with two equivalents of a phosphonium halide of the formula $(PR^6R^7R^8R^9)^+X^-$. This dimeric initiator is stable at temperatures of $-20°$ C. or less (preferably $-40°$ C., more preferably $-78°$ C.), and typically has a lifetime of about 30 minutes at 25° C. Other dimeric initiators of the formula $[(PR^6R^7R^8R^9)^+]_2[(R^{10}R^{11}CCH_2)_2]^{2-}$, where $R^{10}$ and $R^{11}$ are other than Ar, can be made in accordance with this procedure or in combination with known reactions for reducing a 1,1-disubstituted ethylene by electron transfer (e.g., with an alkali metal, by electrochemical reduction at a cathode, etc.) as long as the $R^{10}$ and $R^{11}$ groups are not also reduced under the reaction conditions.

The dimeric initiator can be used to prepare triblock copolymers by reacting it with a first monomer to prepare a "living" anionic first block, followed by reacting the "living" anionic first block with a second monomer to provide terminal blocks on each end of the "living" first block. Thus, the present invention also concerns a method for preparing a triblock copolymer, comprising:

reacting a first monomer of the formula:

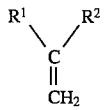

with an initiator of the formula

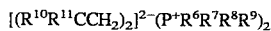

at a temperature of from $-78°$ C. to 40° C., in a solvent in which the initiator at least partially dissolves and which does not quench the reaction, for a length of time sufficient to polymerize the first monomer, wherein:

$R^1$ is selected from the group consisting of H, CN, $CF_3$, alkyl of from 1 to 6 carbon atoms and aryl, $R^2$ is independently selected from the group consisting of CN, C(=X)$R^3$, C(=X)NR$^4$R$^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl (wherein any pair of $R^6$, $R^7$, $R^8$ and $R^9$ may be joined to form a ring, including the possibility that both pairs of $R^6$–$R^9$ may be joined to form a ring [preferably a 3- to 8-membered ring]), and $R^{10}$ and $R^{11}$ are independently alkyl of from 1 to 20 carbon atoms, an aryl group, CN, C(=X)$R^3$ as defined above and C(=X)NR$^4$R$^5$ as defined above, and $R^{10}$ and $R^{11}$ may be joined together to form a ring, except that $R^{10}$ and $R^{11}$ are not both alkyl of from 1 to 20 carbon atoms;

adding a second monomer of the formula:

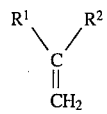

where $R^1$ and $R^2$ are as defined above, the second monomer being distinct from the first monomer, at a temperature of from $-78°$ C. to 40° C., and reacting for a length of time sufficient to form a triblock (co)polymer intermediate, quenching the triblock (co)polymer intermediate with an acyl halide, an acid anhydride or a substance containing an active hydrogen atom to form a triblock (co)polymer; and isolating the formed triblock (co)polymer.

The present invention is also concerned with a triblock copolymer of the formula:

where A' is a first (co)polymer block and B' is a second (co)polymer block, the (co)polymers of each of A' and B' independently being of one or more monomers of the formula:

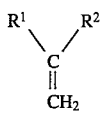

wherein:

$R^1$ is selected from the group consisting of H, CN, $CF_3$, alkyl of from 1 to 6 carbon atoms and aryl;

$R^2$ is independently selected from the group consisting of CN, C(=X)$R^3$, C(=X)NR$^4$R$^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^{10}$ and $R^{11}$ are each independently an aryl group (as defined above); and the first (co)polymer is distinct from said second (co)polymer.

In a further embodiment, a triblock copolymer may be prepared from the dimeric dianion of an aromatic vinyl monomer such styrene or α-methylstyrene prepared, for example, by reacting the aromatic vinyl monomer with sodium or lithium naphthalide (in a known manner). The dimeric dianion of the aromatic vinyl monomer may be subsequently reacted with a monomer selected from the group consisting of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene and mixtures thereof to prepare a dianion of a first polymer block. The first polymer block dianion can then be reacted with a 1,1-diarylethylene in accordance with the above-described method, and the remaining steps of the method (metathesizing with a phosphonium salt, reacting with one or more monomers of the formula $CH_2$=CR$^1$R$^2$, quenching and isolating) can then be conducted to prepare a triblock copolymer in which the inner block is a (co)polymer of styrene, α-methylstyrene, styrene or α-methylstyrene having 1 to 5 $C_1$–$C_4$-alkyl and/or $C_1$–$C_4$-alkoxy substituents on the phenyl ring, butadiene, isoprene, dimethylbutadiene or a mixture thereof, and the outer blocks are of one or more monomers of the formula $CH_2=CR^1R^2$.

The weight or number average molecular weight of each of blocks A' and B' may range from 500 g/mol to 300,000 g/mol, preferably from 1,000 to 200,000 g/mol, and more preferably from 2,000 to 60,000 g/mol. The present triblock copolymers are also preferably "monodisperse" in that they may have a $M_w/M_n$ value of $\leq 2.0$, preferably $\leq 1.5$, and most preferably $\leq 1.1$.

Other carbanions which may be effective in the present process include fluorenyl anions, preferably having from 1 to 8 (more preferably from 1 to 4) alkyl substituents of from 1 to 6 carbon atoms; anions of $C_1$–$C_{20}$ malonate esters, which may be alkylated with a $C_1$–$C_{20}$ group at the 2-position of the malonate; and carbanions of the formula $(Ar-CR^{14}-Me)^-$, in which Ar is aryl (as defined above), $R^{14}$ may be selected from the group consisting of CN, $CO_2R$, $C(=O)R^{15}$ in which $R^{15}$ does not contain a hydrogen atom on the carbon atom adjacent to the carbonyl group, and Ph.

Suitable solvents for the reacting or polymerizing step include ethers, cyclic ethers, aromatic hydrocarbon solvents, and mixtures thereof. Suitable ethers include compounds of the formula $R^{16}OR^{17}$, in which each of $R^{16}$ and $R^{17}$ is independently an alkyl group of from 1 to 6 carbon atoms which may be further substituted with a $C_1$–$C_4$-alkoxy group. Preferably, when one of $R^{16}$ and $R^{17}$ is methyl, the other of $R^{16}$ and $R^{17}$ is alkyl of from 4 to 6 carbon atoms or $C_1$–$C_4$-alkoxyethyl. Examples include diethyl ether, ethyl propyl ether, dipropyl ether, methyl t-butyl ether, di-t-butyl ether, glyme (dimethoxyethane), diglyme (diethylene glycol, dimethyl ether), etc.

Suitable cyclic ethers include THF and dioxane. Suitable aromatic hydrocarbon solvents include benzene, toluene, o-xylene, m-xylene, p-xylene and any isomer or mixture of isomers of cumene.

The initiator should be at least partially soluble in the solvent. Thus, when using an aromatic solvent, the reaction may be advantageously promoted by increasing the lipophilicity of the initiator (e.g., having a $C_6$–$C_{20}$-alkyl substituent in one or both of the ionic components [preferably at least in the phosphonium cation]). For example, if the initiator has the formula $Ar_4P^+$ $Ar'_3C^-$, where each Ar and Ar' are independently an aryl group, one or more of the Ar and Ar' groups should include one or more alkyl substituents having from 1 to 20 carbon atoms, preferably having from 4 to 20 carbon atoms and more preferably having from 6 to 20 carbon atoms. To avoid molecular weight distribution broadening, the polymer should also be soluble in the solvent selected.

The polymerization may be conducted by dropwise addition of a solution of monomer (e.g., 0.01–5.0M, preferably 0.1–2.0M and most preferably about 1.0M in THF) into a solution of initiator in THF (e.g., from $10^{-5}$ to $10^{-1}$, preferably from $10^{-4}$ to $10^{-2}$ and most preferably about $2\times 10^{-3}$ molar equivalents with respect to moles of monomer), in accordance with the reaction scheme shown in Scheme 1 below:

Scheme 1:
The proposed mechanism for the anionic polymerization of MMA in the presence of $Ph_4P^+$ at ambient temperatures.

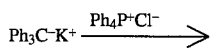

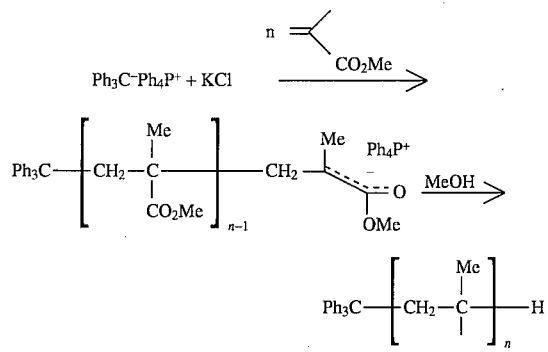

The rate of initiation is very rapid, as observed by an instantaneous change in color from deep maroon to brick-red, characteristic of a polymerization solution, becoming complete typically in a matter of seconds. The observation of a rust-colored polymerization solution usually indicates that termination reactions have occurred, and is often accompanied by a wide MWD of the resulting polymer and lower polymer yields (e.g., 50–65%).

Although the present reaction may be conducted at a temperature of from $-78°$ C. to $40°$ C., the preferred range is from $-20°$ C. to $30°$ C., more preferably from $0°$ C. to $25°$ C.

The organic phosphonium cation is believed to facilitate the formation of narrow MWD (co)polymers at ambient temperature by reducing the rate of termination (e.g., by intramolecular Claisen condensation reaction), relative to the rate of propagation.

Termination of the polymerization using an appropriate quenching reagent rapidly gives a light yellow solution. Suitable quenching reagents in the present process include acyl halides, acid anhydrides and substances containing an active hydrogen atom.

Suitable acyl halides include halides, preferably chlorides, of organic acids, including carboxylic acids, sulfonic acids, phosphonic acids, etc. Such acids are suitably of the formula $R^{18}COX$, $R^{18}SO_2X$ and $R^{18}P(=O)(OR^{19})X$, in which $R^{18}$ is alkyl of from 1 to 20 carbon atoms in which each of the hydrogen atoms may be independently replaced by a halide (preferably a fluoride or a chloride), alkenyl of from 2 to 20 carbon atoms, alkynyl of from 1 to 10 carbon atoms, phenyl which may be substituted with from 1 to 5 halogen atoms or alkyl groups of from 1 to 4 carbon atoms, or aralkyl in which the aryl group is phenyl or substituted phenyl and the alkyl group is from 1 to 6 carbon atoms; X is a fluorine, chlorine, bromine or iodine atom; and $R^{19}$ is alkyl of from 1 to 4 carbon atoms. Preferred acyl halides include benzenesulfonyl chloride, toluenesulfonyl chloride and those of the formula $R^{20}COX$, in which $R^{20}$ is alkyl of from 1 to 4 carbon atoms, vinyl, 2-propenyl or phenyl, and X is chlorine (e.g., acetyl chloride, propionyl chloride, (meth)acryloyl chloride and benzoyl chloride). The most preferred acyl halide is methacryloyl chloride.

Suitable acid anhydrides include those of the formula $(R^{18}CO)_2O$, where $R^{18}$ is as defined above. Preferred acid anhydrides include acetic anhydride, propionic anhydride, and (meth)acrylic anhydride.

Active hydrogen atom-containing substances include those substances in which a hydrogen atom is attached to a heteroatom, and which have a p$K_a$ of about 18 or less. Such compounds include water, alcohols of from 1 to 6 carbon atoms, aqueous solutions of ammonium salts (e.g., ammonium halide or ammonium carbonates), etc., with methanol being the most preferred quenching agent.

In some cases (for example, in the polymerization of vinyl pyridine), up to 10 equivalents of alcohol or water may be necessary to quench the polymerization. Thus, it is believed that small quantities of protic solvents may be tolerated in the present method. As a consequence, it may not be necessary to rigorously purify and dry all starting materials prior to use.

The present isolating step is conducted in accordance with known procedures and methods, such as precipitating the (co)polymer and filtering the precipitated (co)polymer. Precipitation can be conducted using a suitable $C_5$–$C_8$-alkane or cycloalkane solvent, such as hexane, heptane, cyclohexane, pentane, mineral spirits, or a $C_1$–$C_6$-alcohol, such as methanol, ethanol or isopropanol, or any mixture of suitable solvents. Preferably, the solvent for precipitating is hexane, mixtures of hexanes, or methanol.

The precipitated (co)polymer can be filtered by gravity or by vacuum filtration, in accordance with known methods (e.g., using a Büchner funnel and an aspirator). The polymer can then be washed with the solvent used to precipitate the polymer, if desired. The steps of precipitating, filtering and washing may be repeated, as desired.

Once isolated, the (co)polymer may be dried by drawing air through the (co)polymer, by vacuum, etc., in accordance with known methods (preferably by vacuum). The present (co)polymer may be analyzed and/or characterized by size exclusion chromatography, in accordance with known procedures.

The syndiotactic content of PMMA prepared by the present process at 25° C. is moderately high (about 50–70%). The syndiotacticity can be increased by conducting the reaction at a lower temperature. The stereochemistry of PMMA produced by the present method is similar to that obtained by GTP[15] and other MMA polymerizations[16] at comparable temperatures.

[15] (a) Webster, O., Hertler, W. Sogah, D., Farnham, W., and RajanBabu, T. J. Am. Chem. Soc. 1983, 105, 5706. (b) Sogah, D., Hertler, W., Webster, D., and Cohen, G. Macromolecules 1988, 20, 1473. (c) Jenkins, A. Eur. Poly. J. 1993, 29, 449.

[16] (a) Teyssie, P., Fayt, R., Hautekeer, H., Jacobs, C., Jerome, R., Leemans, L., and Varshney, S. Makromol. Chem., Macromol. Symp. 1990, 32, 61. (b) Varshney, S., Jerome, R., Bayard, P., Jacobs, C., Fayt, R., and Teyssie, P. Macromolecules 1992, 25, 4457. (c) Wang, J., Jerome, R., Bayard, P., Baylac, L., Patin,. M., and Teyssie, P. Macromolecules 1994, 27, 4615.

Table 1 below summarizes results obtained for the polymerization of MMA at 0° C. and at 20° C. in THF. The polymers produced generally have a relatively narrow MWD (from 1.04 to 1.79) and are obtained in quantitative yields, indicating that the polymerization proceeds with little chain termination, even at ambient temperatures. An intramolecular Claisen-type termination reaction, usually observed in anionic polymerization of MMA at higher temperatures (e.g., >−20° C.) in the presence of an alkali cation is greatly reduced in the present method as seen from the narrow MWD of the polymers produced.

When the initiator contains protons covalently bound to carbon atoms in an aromatic ring and the monomer does not, the $^1$H NMR of spectra of the polymers display aromatic resonances resulting from the initiator, thus providing a means for determining the number average molecular weight ($M_n$). (The $^1$H NMR analyses providing the $M_n$ results in Table 1 below were performed using a Bruker AM-250 MHz Ft-NMR, and the concentration of the PMMA solutions used in the experiments were 10–15 wt. % in $CDCl_3$.) The $M_{n,NMR}$ was calculated based on the integrated area of the methylene (backbone) resonance signals and the aromatic resonance signals in the $^1$H NMR spectrum. The stereochemistry of the polymers was determined through integration of the $^1$H NMR resonance absorptions of the methyl groups as previously assigned.[17] The $M_n$ as determined by NMR (9300) corresponds well to that determined by SEC (8500).

[17] Bovey, F. High Resolution NMR of Polymers; Academic Press; New York; 1972.

Initiator efficiency (f) is between 3 and 70%, based on the original alkali metal carbanion concentration prior to cation exchange or metathesis (see Table 1). These less-than-quantitative initiator efficiencies may be the result of decomposition of the initiator prior to polymerization. As monitored via UV-VIS spectroscopy at ambient temperatures, the decomposition of $Ph_3C^-$ $Ph_4P^+$ shows a first order dependence on the $Ph_3C^-$ concentration ($T_{1/2}$=211.3 seconds).

Control of molecular weight is possible, and is optimal when polymerization is performed immediately after the formation of the phosphonium-containing initiator. The optimum control of molecular weight is best provided using a Flow Tube Reactor.[18] However, molecular weight control can be somewhat empirically derived for a given initiator and initiator-to-monomer ratio.

[18] Gerner, F., Höcker, H., Müller, A., Schulz, G. Eur. Polym. J. 1984, 20, 349.

TABLE 1

Anionic Polymerization of MMA initiated by $Ph_3C^-$ $Ph_4P^+$ in THF

| Run | $T^a$ | $M_n^{b,c}$ | $M_{n(calc)}^{c,e}$ | $MWD^{b,d}$ | % Yield | $r^f$ | mm | rr$^g$ |
|---|---|---|---|---|---|---|---|---|
| 1 | 0 | 8500 | 3900 | 1.12 | >95 | .46 | .09 | .54 |
| 2 | 0 | 8600 | 4700 | 1.13 | >95 | .54 | | |
| 3 | 0 | 26400 | 9100 | 1.10 | 87 | .40 | | |
| 4 | 0 | 28900 | 9200 | 1.04 | 91 | .32 | .07 | .55 |
| 5 | 0 | 29100 | 10500 | 1.17 | >95 | .36 | .07 | .51 |
| 6 | 20 | 8600 | 1700 | 1.79 | 67 | .20 | | |
| 7 | 20 | 13200 | 5100 | 1.42 | >95 | .39 | | |
| 8 | 20 | 13200 | 8900 | 1.35 | >95 | .68 | | |
| 9 | 20 | 72500 | 2400 | 1.67 | 60 | .03 | | |

$^a$: Temperature (T) in °C.
$^b$: SEC data obtained after calibration with PMMA standards (Polysciences).
$^c$: In (g/mole).
$^d$: MWD = $M_w/M_n$.
$^e$: $M_{n(calc)}$ = % Yield · [Monomer]/100 · [Initiator].
$^f$: Initiator Efficiency (f) = $M_{n(calc)}/M_{n(GPC)}$.
$^g$: Calculated from the $^1$H NMR (360.13 MHz) integration of the backbone methyl groups of the polymer.

A continuous flow reactor system (such as those conventional continuous flow reactors known in the art) will also help to overcome potential problems with bulk polymerization, which may include, for example, generation of an appreciable amount of heat. In a continuous flow system, the heat of reaction may be dissipated more efficiently than in a bulk system, where some contents of the reaction mixture may be relatively far removed from a heat-exchange surface.

The polymers produced by the present method are "monodisperse"; that is, the polymers have a narrow molecular weight distribution. In its broadest sense, a "monodisperse" polymer has a ratio of weight average molecular weight to number average molecular weight ($M_w/M_n$) of 2.0 or less, more preferably of 1.5 or less, and most preferably of 1.1 or less.

The number average molecular weight of polymer produced by the present method depends linearly on the conversion.

A further initiator suitable for use in the present invention is the phosphonium salt of an isobutyric ester enolate. The advantage of this initiator is that it has the same structure of the monomer units of the corresponding methacrylate polymer.

Having generally described the present invention, a further understanding can be obtained by reference to the following specific examples, which are provided herein for purposes of illustration only and are not intended to be limiting of the present invention.

EXAMPLES

Reagents and Solvents:

High-vacuum and break-seal techniques were utilized in the experiments. The solvents (tetrahydrofuran (THF) and toluene) were purified by distillation from a sodium-potassium alloy (2×) prior to use. Methyl methacrylate (MMA) and n-butyl acrylate (n-BuA) were distilled from $CaH_2$ (2×) and triethyl aluminum ($Et_3Al$) and stored in ampoules at −78° C. to prevent thermal polymerization. Purification of 2-vinylpyridine (2-VP) was performed by distillation of the monomer from a potassium (K) mirror (2×), and subsequently, the monomer was stored in ampoules at ×78° C. Tetrabutylammonium chloride ($NBu_4Cl$) and tetraphenylphosphonium chloride ($Ph_4PCl$) were dried by heating (80° C.) the salts under high-vacuum prior to use. About a hundred polymerizations were performed, and about 60 of those runs were performed in the presence of $Ph_4P^+$.

The carbanions used as initiators were prepared as shown in Schemes 2–4 below:

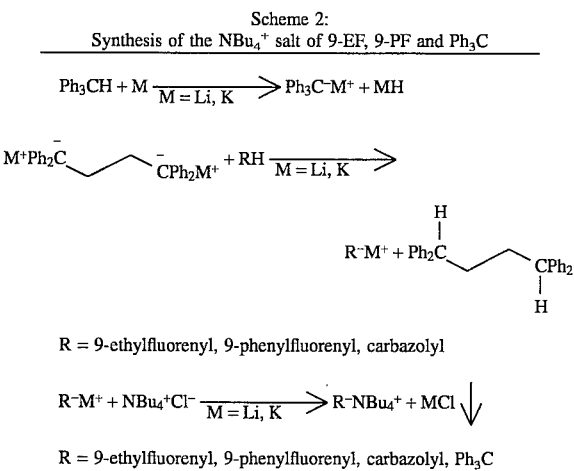

Scheme 3:
Synthesis of the $Ph_4P^+$ salt of $Ph_3C$

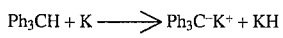

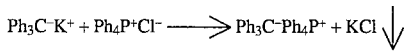

Scheme 4:
Synthesis of the $Ph_4P^+$ salt of $2\text{-}PyrPh_2C$

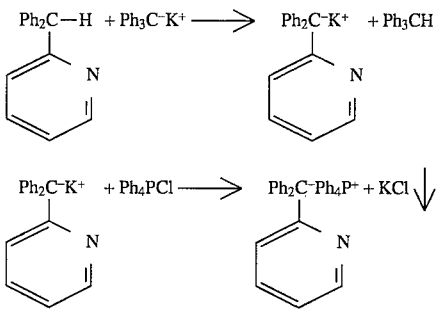

Comparative Experiment: Anionic Polymerization of MMA in the Presence of $NBu_4^+$ in THF The $NBu_4^+$ salts of 9-phenylfluorenyl (9-PF, yellow), 9-ethylfluorenyl (9-EF, red-orange), triphenylmethyl ($Ph_3C$, red), and carbazolyl (CB, brown) anions were prepared by cation exchange of the respective potassium ($K^+$) salts of the carbanions with $NBu_4^+Cl^-$. For $Ph_3C$, the cation exchange was performed in situ prior to the polymerization at −78° C. in order to reduce the decomposition of the initiator. In a typical polymerization, the initator ($2 \times 10^{-4}$ mol) was added to ~50 mL of THF and brought to the desired temperature (−78° to 30° C.). Consequently, MMA (~1–3 g) was added by distillation into the polymerization flask (when the polymerization temperature was <0° C.) or added dropwise to the polymerization solution (at temperatures >0° C.). The temperature of the polymerization was maintained using a temperature-controlled bath. The monomer addition was accomplished in from ~20 to 30 min., and thereafter, the polymerization was terminated with methanol. The polymerization solution was generally orange in color, and the color was attributed to either residual initiator due to slow initiation at low temperatures or the color of the propagating chain in the presence of $NBu_4^+$. The terminated solution was colorless. The results of the polymerizations are summarized in Table 2.

TABLE 2

| | Anionic Polymerization of MMA in the Presence of Li, K, $NBu_4$ Cations in THF | | | | | | | | | |
|---|---|---|---|---|---|---|---|---|---|---|
| Initiator[a] | T (°C.) | $M_p$[b] | $M_w$[b] | $M_n$[b] | $M_{n(calc)}$[b,c] | MWD[b,d] | % Yield | f[e] | mm[f] | mr[f] | rr[f] |
| 9-EFLi | −78 | 9900 | 9500 | 9300 | 8800 | 1.02 | 95 | .94 | .12 | .33 | .55 |

TABLE 2-continued

Anionic Polymerization of MMA in the Presence of Li, K, NBu$_4$ Cations in THF

| Initiator[a] | T (°C.) | $M_p$[b] | $M_w$[b] | $M_n$[b] | $M_{n(calc)}$[b,c] | MWD[b,d] | % Yield | f[e] | mm[f] | mr[f] | rr[f] |
|---|---|---|---|---|---|---|---|---|---|---|---|
| 9-EFLi | −15 | 204600 | 129300 | 26700 | 26300 | 4.84 | 92 | .99 | | | |
| 9-EFK | −78 | 4400 | 6000 | 3900 | 4200 | 1.55 | >95 | 1.0 | .32 | .35 | .33 |
| 9-EFNBu$_4$ | −78 | 4600 | 6700 | 3400 | 800 | 1.95 | 12 | .22 | .11 | .25 | .64 |
| 9-EFNBu$_4$ | −20 | 10000 | 16000 | 8600 | 6900 | 1.86 | 78 | .80 | | | |
| 9-EFNBu$_4$ | 0 | 4200 | 7400 | 3900 | 5300 | 1.77 | 64 | 1.0 | .18 | .30 | .52 |
| 9-EFNBu$_4$ | 15 | 19900 | 22000 | 6700 | 6000 | 3.29 | >95 | .90 | | | |
| 9-EFNBu$_4$ | 20 | 52900 | 47700 | 12500 | 11600 | 3.8 | >95 | .93 | | | |
| Ph$_3$CNBu$_4$ | 20 | 395300 | 384700 | 322400 | 1200 | 1.19 | 5 | .01 | | | |

[a]9-ethylfluorenyl (9-EF).
[b]SEC data, calibrated with PMMA standards (Polysciences).
[c]$M_{n(calc)}$ = [Monomer]/[Initiator].
[d]MWD = $M_w/M_n$.
[e]Initiator efficiency (f) = $M_{n(calc)}/M_{n(SEC)}$.
[f]Calculated from the $^1$HNMR spectra of the α-methyl groups at 360.13 MHz.

Example 1: Anionic Polymerization of MMA in the Presence of Ph$_4$P$^+$ in THF

A typical polymerization involved 3 major steps: cation metathesis, polymerization, and termination. The K$^+$ salt of Ph$_3$C (red-orange) or diphenyl-2-pyridylmethyl (2-PyrPh$_2$C, red) (2.0×10$^{-4}$ mol, 0.20M in THF) was added to a flask containing ~5 mL of THF, and and the flask was cooled to −78° C. Subsequently, the cation exchange was accomplished by addition of Ph$_4$PCl (white solid, 2.2×10$^{-4}$ mol) to the initiator solution to produce Ph$_3$C-Ph$_4$ (deep-maroon). Thereafter, THF (~50 mL, at the desired temperature of −78° to 30° C.) was added to the initiator solution. The temperature of the polymerization was maintained using a temperature-controlled bath. An MMA-THF solution (~10–30 mL, 1.0M) was added to the initiator solution in a steady stream (~2 min. addition time). A maroon-red (orange at lower initiator concentrations) polymerization solution was instantaneously produced. The rate of addition of monomer is important in determining the MWD of the resulting polymers. Homogeneous mixing of the monomer is necessary to get narrow distribution PMMA. The termination of the polymerization was accomplished by addition of methanol to rapidly give a pale yellow solution. Tables 3 and 4 list the results of the polymerizations using Ph$_3$C and 2-PyrPh$_2$C in the presence of Ph$_4$P$^+$ at various temperatures.

TABLE 3

Anionic Polymerization of MMA initiated by Ph$_3$C$^-$ Ph$_4$P$^+$ in THF

| Run | T (°C.) | $M_p$[a] | $M_w$[a] | $M_n$[a] | $M_{n(calc)}$[b] | MWD[a,c] | % Yield | f[d] | mm[e] | mr[e] | rr[e] |
|---|---|---|---|---|---|---|---|---|---|---|---|
| 1 | −78 | 26200 | 24300 | 24100 | 6900 | 1.01 | >95 | .28 | | | |
| 2 | 0 | 8400 | 9600 | 8500 | 3900 | 1.12 | >95 | .46 | .09 | .37 | .54 |
| 3 | 0 | 8100 | 9700 | 8600 | 4700 | 1.13 | >95 | .54 | | | |
| 4 | 0 | 31300 | 29100 | 26400 | 9100 | 1.10 | 87 | .40 | | | |
| 5 | 0 | 30500 | 30200 | 28900 | 9200 | 1.04 | 91 | .32 | .07 | .38 | .55 |
| 6 | 0 | 43900 | 34100 | 29100 | 10500 | 1.17 | >95 | .36 | .07 | .42 | .51 |
| 7 | 20 | 26400 | 18700 | 13200 | 5100 | 1.42 | >95 | .39 | | | |
| 8 | 20 | 17800 | 17800 | 13200 | 8900 | 1.35 | >95 | .68 | | | |

[a]SEC data, calibrated with PMMA standards (Polysciences).
[b]$M_{n(calc)}$ = [Monomer]/[Initiator].
[c]MWD = $M_w/M_n$.
[d]Initiator Efficiency (f) = $M_{n(calc)}/M_{n(SEC)}$.
[e]Calculated from the $^1$H NMR spectra of the α-methyl groups at 360.13 MHz.

TABLE 4

Anionic Polymerization of MMA initiated by 2-PyrPh$_2$C$^-$Ph$_4$P$^+$ in THF

| Run | T (°C.) | $M_p$[a] | $M_w$[a] | $M_n$[a] | $M_{n(calc)}$[b] | MWD[a,c] | % Yield | f[d] |
|---|---|---|---|---|---|---|---|---|
| 1 | 0 | 15900 | 14300 | 12700 | 5400 | 1.13 | >95 | .42 |
| 2 | 0 | 31300 | 31100 | 27500 | 9900 | 1.13 | >95 | .36 |

[a]SEC data, calibrated with PMMA standards (Polysciences).
[b]$M_{n(calc)}$ = [Monomer]/[Initiator].
[c]MWD = $M_w/M_n$.
[d]Initiator Efficiency (f) = $M_{n(calc)}/M_{n(SEC)}$.

Example 2: Anionic Polymerization of MMA in the Presence of $Ph_4P^+$ in Toluene-THF and Toluene at 0° C.

The same procedure was used as given above (Example 1), the only difference being the solvent used in the polymerization. When toluene was used as a solvent, some precipitate (black) was observed when $Ph_3C$-$Ph_4P+$ was introduced into the toluene, and the initiator solution was blue-violet in color. The addition of MMA-toluene (~10 mL over ~3 min., 1.0M) produced a black solution with an insoluble black precipitate. Termination with methanol produced a clear solution. The PMMA was obtained in 10% yield with an $M_n$=30800 ($M_{n(calc)}$=640, f=0.21), $M_w$=68700, $M_p$=74100, and MWD=2.23.

The polymerization was also performed in a THF-toluene mixture (5:1 by volume). Upon addition of toluene to the initiator solution in THF, a maroon colored solution with some black precipitate was observed. Addition of MMA-THF-toluene (~10 mL over ~3 min., 1.0M) produced a brown polymerization solution, which became pale yellow upon addition of methanol. The PMMA was produced in 5% yield and had two distinct sizes of polymers. One of the polymers had a $M_n$=2700 ($M_{n(calc)}$=800, f=0.29), $M_w$=3100, $M_p$=3400, and a MWD=1.13, and the other polymer had a $M_n$=62600 ($M_{n(calc)}$=800, f=0.01), $M_w$=62400, $M_p$=64400, and a MWD=1.05.

Example 3: Anionic Polymerization of n-BuA in the Presence of $Ph_4P^+$ in THF The same procedure was used as given above (Example 1). The polymerization solution was orange and rapidly changed to pale yellow upon termination of polymerization. The data for the PBuA obtained are given in Table 5.

results of the block-copolymerizations of MMA and n-BuA are tabulated in Table 6. The PMMA precursor was isolated and analyzed in one of the experiments.

Example 5: Anionic Polymerization of MMA in the Presence of (p-methoxyphenyl)$_4$P$^+$ in THF at 0° C.

The same procedure was used as given above (Example 1) with the exception of the addition of (p-methoxyphenyl)$_4$PBr instead of $Ph_4PCl$ during the cation exchange. The synthesis of (p-methoxyphenyl)$_4$PBr was performed as previously reported.[19] The polymerization at 0° C. produced PMMA of relatively narrow MWD (2.33) with $M_n$=25200 ($M_{n(calc)}$=320, f=0.01), $M_w$=58700, $M_p$=70500 in 27% yield. Purification of the salt was difficult since only a small amount was made. Optimization of the synthesis and purification of the resulting salt is predicted to give better MWDs and polymer yields.

[19] a) L. Horner, G. Mummenthey, H. Moser, and P. Beck, Chem. Ber., 1966, 99, 2782. b) L. Horner and U. Duda, Tetrahedron Lett., 1970, 59, 5177. c) S. Affandi, R. Green, B. Hsieh, M. Holt, and J. Nelson, Synth. React. Inorg. Met-Org. Chem., 1987, 17, 307.

TABLE 5

Anionic Polymerization of n-BuA initiated by $Ph_3C^-$ $Ph_4P^+$ in THF

| Run | T (°C.) | $M_p{}^a$ | $M_w{}^a$ | $M_n{}^a$ | $M_{n(calc)}{}^b$ | MWD$^{a,c}$ | % Yield | f$^d$ |
|---|---|---|---|---|---|---|---|---|
| 1 | 0  | 7700 | 6000 | 4200 | 4200 | 1.41 | >95 | 1.0 |
| 2 | 0  | 7100 | 6900 | 5100 | 5000 | 1.37 | 86  | .98 |
| 3 | 0  | 9600 | 9000 | 7200 | 9200 | 1.24 | 80  | 1.3 |
| 4 | 23 | 5100 | 4700 | 3800 | 5400 | 1.23 | 86  | 1.4 |
| 5 | 23 | 8200 | 7500 | 5200 | 9100 | 1.43 | 88  | 1.7 |

$^a$SEC data, calibrated with PMMA standards (Polysciences).
$^b M_{n(calc)}$ = [Monomer]/[Initiator].
$^c$MWD = $M_w/M_n$.
$^d$Initiator Efficiency (f) = $M_{n(calc)}/M_{n(SEC)}$.

Example 4: Anionic Block Copolymerization of MMA and n-BuA in the Presence of $Ph_4P^+$ in THF at 0° C.

The same procedure was used given above (Example 1). The initial monomer added was MMA (~1–5 mL, 0.80M in THF) followed by n-BuA (~1–10 mL, 1.0M in THF). The

TABLE 6

Anionic Block Copolymerization of MMA and n-BuA initiated by $Ph_3C^-$ $Ph_4P^+$ in THF at 0° C.

| Run | PMMA | | | PMMA-PBuA | | | | | | |
|---|---|---|---|---|---|---|---|---|---|---|
|  | $M_n{}^a$ | $M_{n(calc)}{}^b$ | MWD$^{a,c}$ | $M_p{}^a$ | $M_w{}^a$ | $M_n{}^a$ | $M_{n(calc)}{}^b$ | MWD$^{a,c}$ | % Yield | f$^d$ |
| 1 | e | 840 | e | 5100 | 5300 | 4300 | 3100 | 1.23 | 88 | .73 |

TABLE 6-continued

Anionic Block Copolymerization of MMA and n-BuA
initiated by $Ph_3C^- Ph_4P^+$ in THF at 0° C.

| | PMMA | | | PMMA-PBuA | | | | | | |
|---|---|---|---|---|---|---|---|---|---|---|
| Run | $M_n^a$ | $M_{n(calc)}^b$ | $MWD^{a,c}$ | $M_p^a$ | $M_w^a$ | $M_n^a$ | $M_{n(calc)}^b$ | $MWD^{a,c}$ | % Yield | $f^d$ |
| 2 | e | 720 | e | 9900 | 9000 | 7600 | 6600 | 1.19 | 71 | .88 |
| 3 | 1300 | 1200 | 1.07 | 11900 | 10600 | 9100 | 10300 | 1.17 | 88 | 1.1 |

[a] SEC data, calibrated with PMMA standards (Polysciences).
[b] $M_{n(calc)}$ = [Monomer]/[Initiator].
[c] $MWD = M_w/M_n$.
[d] Initiator Efficiency (f) = $M_{n(calc)}/M_{n(SEC)}$.
[e] PMMA precursor was not isolated.

Example 6: Anionic Polymerization of 2-VP in the Presence of $Ph_4P+$ in THF at 0° C.

The same procedure was used as given above (Example 1) except 2-VP replaced MMA. The polymerization solution was red in color, and termination of the polymerization with 100 equivalents of methanol did not occur at 0° C. since the red color persisted after addition of methanol. Thereafter, the reaction temperature was raised to room temperature and, the polymerization was terminated as supported by the disappearance of the red color. Poly-2-VP was obtained in 66% yield with a $M_n$=9300 ($M_{n(calc)}$=3800, f=0.41) $M_w$=17500, $M_p$=17100, and a MWD=1.88.

Example 7: Anionic Polymerization of MMA initiated by Methoxy Trimethylsilyl Dimethylketene Acetal (MTS) Using $Ph_3C^- Ph_4P^+$ as Catalyst in THF at 22° C.

The same procedure was used as given above (Example 1) with a major difference in the initiator system. The $Ph_3C^-K^+$ ($3\times10^{-6}$ mol) was added to MTS ($2.5\times10^{-3}$ mol) to produce a peach colored solution, which upon addition of $Ph_4PCl$ changed to an orange colored solution. The MMA ($5\times10^{-2}$ mol) was added within 6 minutes to produce an orange polymerization solution, which upon termination with methanol produced a pale yellow solution. The PMMA was obtained in low yields (1%) with $M_n$=15300, $M_w$=27500, $M_p$=24500, and MWD=1.8. Increasing the monomer addition time and reaction time (to ~60 mins.) as previously reported in a related system[20] may improve the polymer yield, molecular weight control, and MWD.

[20] R. Quirk and G. Bidinger, Polym. Bull., 1989, 22, 63.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A method for preparing a (co)polymer, comprising the steps of:

reacting a monomer of the formula:

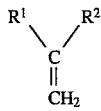

with an initiator of the formula

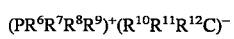

or of the formula

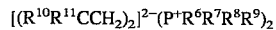

at a temperature of from −78° C. to 40° C., in a solvent in which the initiator at least partially dissolves and which does not quench the reaction, for a length of time sufficient to polymerize the monomer(s) and form a reaction mixture, wherein:

$R^1$ is selected from the group consisting of H, CN, $CF_3$, alkyl of from 1 to 6 carbon atoms and aryl, $R^2$ is independently selected from the group consisting of CN, C(=X)$R^3$, C(=X)N$R^4R^5$ and heterocyclic rings capable of stabilizing an α-anion, where X is NR (R is $C_1-C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$ and $R^9$ are independently alkyl of from 1 to 20 carbon atoms, aryl or aralkyl (wherein any pair of $R^6$, $R^7$, $R^8$ and $R^9$ may be joined to form a ring, including the possibility that both pairs of $R^6$–$R^9$ may be joined to form a ring), $R^{10}$ and $R^{11}$ are independently alkyl of from 1 to 20 carbon atoms, an aryl group, CN, C(=X)$R^3$ as defined above and C(=X)N$R^4R^5$ as defined above, and $R^{10}$ and $R^{11}$ may be joined together to form a ring, except that $R^{10}$ and $R^{11}$ are not both alkyl of from 1 to 20 carbon atoms, and $R^{12}$ is independently H, alkyl of from 1 to 20 carbon atoms, aryl or a (co)polymer radical;

quenching the reaction mixture with an acyl halide, an acid anhydride or a substance containing an active hydrogen atom to form a (co)polymer; and isolating the formed (co)polymer.

2. The method of claim 1, wherein $R^6$, $R^7$, $R^8$ and $R^9$ are independently phenyl, naphthyl, phenyl having from 1 to 5 substituents or naphthyl having from 1 to 7 substituents, each of said substituents being independently selected from the group consisting of alkyl of from 1 to 20 carbon atoms, alkyl of from 1 to 6 carbon atoms in which each of the hydrogen atoms may be independently replaced by a halide, alkenyl of from 1 to 20 carbon atoms, alkynyl of from 1 to 20 carbon atoms, alkoxy of from 1 to 6 carbon atoms, alkylthio of from 1 to 6 carbon atoms, phenyl, halogen, $C_1-C_6$-dialkylamino, phenyl substituted with from 1 to 5 halogen atoms and phenyl substituted with from 1 to 5 alkyl groups of from 1 to 4 carbon atoms.

3. The method of claim 2, wherein $R^6$, $R^7$, $R^8$ and $R^9$ are independently phenyl, phenyl substituted from 1 to 5 times with fluorine or chlorine, or phenyl substituted from 1 to 3 times with a substituent selected from the group consisting of alkyl of from 1 to 6 carbon atoms, alkoxy of from 1 to 4 carbon atoms and phenyl.

4. The method of claim 1, wherein said reacting is conducted at a temperature of from −20° C. to 30° C.

5. The method of claim 4, wherein said reacting is conducted at a temperature of from 0° C. to 25° C.

6. The method of claim 1, wherein said quenching is conducted with water or an alcohol of from 1 to 6 carbon atoms.

7. The method of claim 1, wherein said initiator has the formula $$(PR^6R^7R^8R^9)^+(R^{10}R^{11}R^{12}C)^-$$

wherein:

$R^{10}$ and $R^{11}$ are independently $C(=X)R^3$, $C(=X)NR^4R^5$, phenyl, naphthyl, phenyl having from 1 to 5 substituents or naphthyl having from 1 to 7 substituents; where X is O, S or NR where R is $C_1$–$C_{20}$ alkyl;

$R^3$ being alkyl of from 1 to 20 carbon atoms, alkoxy of from 1 to 20 carbon atoms or alkylthio of from 1 to 20 carbon atoms, $R^4$ and $R^5$ being independently alkyl of from 1 to 20 carbon atoms or being joined together to form an alkylene group of from 2 to 5 carbon atoms thus forming a 3- to 6-membered ring, and each of said substituents being independently selected from the group consisting of alkyl of from 1 to 20 carbon atoms, alkyl of from 1 to 6 carbon atoms in which each of the hydrogen atoms may be independently replaced by a halide, alkenyl of from 1 to 20 carbon atoms, alkynyl of from 1 to 20 carbon atoms, alkoxy of from 1 to 6 carbon atoms, alkylthio of from 1 to 6 carbon atoms, phenyl, halogen, $C_1$–$C_6$-dialkylamino, phenyl substituted with from 1 to 5 halogen atoms and phenyl substituted with from 1 to 5 alkyl groups of from 1 to 4 carbon atoms; and $R^{12}$ is independently H, alkyl of from 1 to 20 carbon atoms, phenyl, naphthyl, phenyl having from 1 to 5 substituents or naphthyl having from 1 to 7 substituents; each of said substituents being independently selected from the group consisting of alkyl of from 1 to 20 carbon atoms, alkyl of from 1 to 6 carbon atoms in which each of the hydrogen atoms may be independently replaced by a halide, alkenyl of from 1 to 20 carbon atoms, alkynyl of from 1 to 20 carbon atoms, alkoxy of from 1 to 6 carbon atoms, alkylthio of from 1 to 6 carbon atoms, phenyl, halogen, $C_1$–$C_6$-dialkylamino, phenyl substituted with from 1 to 5 halogen atoms and phenyl substituted with from 1 to 5 alkyl groups of from 1 to 4 carbon atoms.

8. The method of claim 7, wherein $R^{10}$ and $R^{11}$ are independently phenyl or phenyl having from 1 to 3 substituents selected from the group consisting of alkyl of from 1 to 6 carbon atoms, alkoxy of from 1 to 4 carbon atoms, phenyl and halogen; and $R^{12}$ is independently H, alkyl of from 1 to 6 carbon atoms, phenyl, or phenyl having from 1 to 3 substituents selected from the group consisting of alkyl of from 1 to 6 carbon atoms, alkoxy of from 1 to 4 carbon atoms, phenyl and halogen.

9. The method of claim 1, wherein said initiator has the formula:

(co)polymer-$(CPh_2)^-(PR^6R^7R^8R^9)^+$

10. The method of claim 9, wherein said (co)polymer radical is of one or more monomers selected from the group consisting of styrene, α-methylstyrene, styrene having 1 to 5 substituents on the phenyl ring, α-methylstyrene having 1 to 5 substituents on the phenyl ring, butadiene, isoprene, dimethylbutadiene, and mixtures thereof; said substituents being selected from the group consisting of $C_1$–$C_4$-alkyl and $C_1$–$C_4$-alkoxy.

11. The method of claim 1, wherein said monomer is a (meth)acrylate ester of a $C_1$–$C_{20}$ alcohol, acrylonitrile, a cyanoacrylate ester of a $C_1$–$C_{20}$ alcohol, a didehydromalonate ester of $C_1$–$C_6$ alcohols, a vinyl ketone in which the α-carbon atom of the alkyl group does not bear a hydrogen atom, a styrene having one or more halogen atoms, nitro groups, $C_1$–$C_6$ ester groups or cyano groups on the phenyl ring, or a vinyl heterocycle selected from the group consisting of 2-vinyl pyridine, 6-vinyl pyridine, 2-vinyl pyrrole, 5-vinyl pyrrole, 2-vinyl oxazole, 5-vinyl oxazole, 2-vinyl thiazole, 5-vinyl thiazole, 2-vinyl imidazole, 5-vinyl imidazole, 3-vinyl pyrazole, 5-vinyl pyrazole, 3-vinyl pyridazine, 6-vinyl pyridazine, 3-vinyl isoxazole, 3-vinyl isothiazoles, 2-vinyl pyrimidine, 4-vinyl pyrimidine, 6-vinyl pyrimidine, and vinyl pyrazine; wherein said vinyl heterocycle may bear one or more $C_1$–$C_6$ alkyl or alkoxy groups, cyano groups, ester groups or halogen atoms, and when said vinyl heterocycles are unsubstituted, then they contain N-H groups which are blocked or protected.

12. The method of claim 11, wherein said monomer is methyl methacrylate.

13. A method for preparing a triblock (co)polymer, comprising the steps of:

reacting a first monomer of the formula:

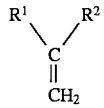

with an initiator of the formula $$[(R^{10}R^{11}CCH_2)_2]^{2-}(P^+R^6R^7R^8R^9)_2$$

at a temperature of from −78° C. to 40° C., in a solvent in which the initiator at least partially dissolves and which does not quench the reaction, for a length of time sufficient to polymerize the first monomer, wherein:

$R^1$ is selected from the group consisting of H, CN, $CF_3$, alkyl of from 1 to 6 carbon atoms and aryl, $R^2$ is independently selected from the group consisting of CN, $C(=X)R^3$, $C(=X)NR^4R^5$ and heterocyclic rings capable of stabilizing an α-anion, where X is NR (R is $C_1$–$C_{20}$ alkyl), O or S, $R^3$ is alkyl of from 1 to 20 carbon atoms, alkoxy of from 1 to 20 carbon atoms or alkylthio of from 1 to 20 carbon atoms, and $R^4$ and $R^5$ are independently alkyl of from 1 to 20 carbon atoms or are joined together to form an alkylene group of from 2 to 5 carbon atoms, thus forming a 3- to 6-membered ring;

$R^6$, $R^7$, $R^8$, $R^9$ are independently alkyl of from 1 to 20 carbon atoms, aryl or aralkyl (wherein any pair of $R^6$, $R^7$, $R^8$ and $R^9$ may be joined to form a ring, including the possibility that both pairs of $R^6$–$R^9$ may be joined to form a ring), and $R^{10}$ and $R^{11}$ are independently alkyl of from 1 to 20 carbon atoms, an aryl group, CN, $C(=X)R^3$ as defined above and C(=X)NR⁴R⁵ as defined above, and R¹⁰ and R¹¹ may be joined together to form a ring, except that R¹⁰ and R¹¹ are not both alkyl of from 1 to 20 carbon atoms;

adding a second monomer of the formula:

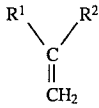

where R¹ and R² are as defined above, said second monomer being distinct from said first monomer, at said temperature and reacting for a length of time sufficient to form a triblock (co)polymer intermediate, quenching the triblock (co)polymer intermediate with an acyl halide, an acid anhydride or a substance containing an active hydrogen atom to form a triblock (co)polymer; and isolating the formed triblock (co)polymer.

14. A method for preparing a block (co)polymer, comprising the steps of:

anionically polymerizing one or more first monomers to form a (co)polymer anion;

reacting said polymer anion with a 1,1-diarylethylene to form a (co)polymer-diarylmethyl anion;

metathesizing said (co)polymer-diarylmethyl anion with a phosphonium halide salt of the formula:

$(PR^6R^7R^8R^9)^+X^-$ where X is an inorganic anion, and R⁶, R⁷, R⁸, R⁹ are independently alkyl of from 1 to 20 carbon atoms, aryl or aralkyl (wherein any pair of R⁶, R⁷, R⁸ and R⁹ may be joined to form a ring, including the possibility that both pairs of R⁶–R⁹ may be joined to form a ring), to provide an initiator;

reacting said initiator with one or more monomers of the formula:

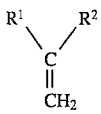

at a temperature of from −78° C. to 40° C., in a solvent in which the initiator at least partially dissolves and which does not quench the reaction, for a length of time sufficient to polymerize the first monomer, wherein R¹ is selected from the group consisting of H, CN, CF₃, alkyl of from 1 to 6 carbon atoms and aryl, and R² is independently selected from the group consisting of CN, C(=X)R³, C(=X)NR⁴R⁵ and heterocyclic rings capable of stabilizing an α-anion, where X is NR (R is $C_1$–$C_{20}$ alkyl), O or S, R³ is alkyl of from 1 to 20 carbon atoms, alkoxy of from 1 to 20 carbon atoms or alkylthio of from 1 to 20 carbon atoms, and R⁴ and R⁵ are independently alkyl of from 1 to 20 carbon atoms or are joined together to form an alkylene group of from 2 to 5 carbon atoms, thus forming a 3- to 6-membered ring, to form a reaction mixture;

quenching the reaction mixture with an acyl halide, an acid anhydride or a substance containing an active hydrogen atom to form a block (co)polymer; and isolating the formed block (co)polymer.

15. The method of claim 14, where said anionically polymerizing comprises reacting said first monomer(s) with a $C_1$–$C_4$-alkyllithium reagent.

16. The method of claim 14, wherein X⁻ is selected from the group consisting of a halide, nitrate, nitrite, borate, trifluoromethanesulfonate, $(SO_4)_{0.5}$, $(PO_4)_{0.33}$ and $(CO_3)_{0.5}$.

* * * * *